United States Patent
Zhang et al.

(10) Patent No.: US 12,427,802 B2
(45) Date of Patent: Sep. 30, 2025

(54) OPTICAL ANTI-COUNTERFEITING ELEMENT AND OPTICAL ANTI-COUNTERFEITING PRODUCT

(71) Applicants: Zhongchao Special Security Technology Co., Ltd, Beijing (CN); China Banknote Printing and Minting Corp., Beijing (CN)

(72) Inventors: Weiwei Zhang, Beijing (CN); Kai Sun, Beijing (CN); Chunhua Hu, Beijing (CN)

(73) Assignees: Zhongchao Special Security Technology Co., Ltd, Beijing (CN); China Banknote Printing and Minting Corp., Beijing (CN)

( * ) Notice: Subject to any disclaimer, the term of this patent is extended or adjusted under 35 U.S.C. 154(b) by 627 days.

(21) Appl. No.: 17/633,165

(22) PCT Filed: Aug. 7, 2020

(86) PCT No.: PCT/CN2020/107721
§ 371 (c)(1),
(2) Date: Feb. 4, 2022

(87) PCT Pub. No.: WO2021/027708
PCT Pub. Date: Feb. 18, 2021

(65) Prior Publication Data
US 2022/0297465 A1    Sep. 22, 2022

(30) Foreign Application Priority Data
Aug. 9, 2019 (CN) .......... 201910734492.X (51) Int. Cl.
G02B 5/08 (2006.01)
B42D 25/324 (2014.01)
(Continued)

(52) U.S. Cl.
CPC ......... B42D 25/373 (2014.10); B42D 25/324 (2014.10); B42D 25/351 (2014.10); G02B 5/0816 (2013.01)

(58) Field of Classification Search
CPC .......... G02B 5/08; G02B 5/0816; G02B 5/09; G02B 5/18; G02B 5/28; G02B 5/285;
(Continued)

(56) References Cited

U.S. PATENT DOCUMENTS

2005/0104364 A1    5/2005  Keller et al.
2012/0170124 A1*   7/2012  Fuhse ................. B42D 25/324
                                                      359/590

FOREIGN PATENT DOCUMENTS

CN    1546602 A     11/2004
CN    102501500 A    6/2012
(Continued)

OTHER PUBLICATIONS

English translation of WO-2013177829 (Year: 2013).*
(Continued)

Primary Examiner — Jie Lei
(74) Attorney, Agent, or Firm — Dennemeyer & Associates LLC (57) ABSTRACT

The disclosure provides an optical anti-counterfeiting element (1) and an optical anti-counterfeiting product (0), which belong to the technical field of optical anti-counterfeiting. The optical anti-counterfeiting element includes: a substrate (2) having a first surface (21) and a second surface (22) opposite each other, at least a partial region of the substrate is transparent; and a first transflective coating (31), a dielectric layer (32) and a second transflective coating (33) which are sequentially deposited on the first surface, wherein a ratio of a refractive index to an extinction coefficient of the first transflective coating is different from a
(Continued)

ratio of a refractive index to an extinction coefficient of the second transflective coating. When observed from the first surface, the optical anti-counterfeiting element appears in a relatively bright first color; when observed from the second surface, the optical anti-counterfeiting element appears in a relatively bright second color.

11 Claims, 4 Drawing Sheets

(51) Int. Cl.
*B42D 25/351* (2014.01)
*B42D 25/373* (2014.01)

(58) Field of Classification Search
CPC ........ G02B 3/00; G02B 3/005; G02B 3/0056; G02B 3/06; G02B 3/08; G02B 27/60; G02B 27/112; B42D 25/373; B42D 25/324; B42D 25/351; B42D 25/36; B42D 25/445; B42D 25/20; B42D 25/23; B42D 25/29
USPC ....... 359/839, 838, 584, 585, 586, 580, 582, 359/566, 576, 627, 742, 2; 283/85, 87, 283/89, 58, 57
See application file for complete search history.

(56) References Cited

FOREIGN PATENT DOCUMENTS

| CN | 102514443 A | 6/2012 | |
|----|-------------|--------|---|
| CN | 103050055 A | 4/2013 | |
| CN | 106891637 A | 6/2017 | |
| CN | 110001234 A | 7/2019 | |
| DE | 102009041583 A1 | 3/2011 | |
| WO | 03070482 A1 | 8/2003 | |
| WO | WO-2013177829 A1 * | 12/2013 | ........... G02B 5/1809 |

OTHER PUBLICATIONS

Extended European search report mailed on Sep. 28, 2023.
International Search Report issued in connection with PCT Application No. PCT/CN2020/107721 dated Oct. 15, 2020.

* cited by examiner

OPTICAL ANTI-COUNTERFEITING ELEMENT AND OPTICAL ANTI-COUNTERFEITING PRODUCT

CROSS-REFERENCE TO RELATED APPLICATION

The disclosure claims the benefit of Chinese Patent Application No. 201910734492. X filed on Aug. 9, 2019, the content of which is incorporated herein by reference.

TECHNICAL FIELD

The disclosure relates to the technical field of optical anti-counterfeiting, and in particular to an optical anti-counterfeiting element and an anti-counterfeiting product.

BACKGROUND

Being awfully sensitive to color and color change, human eyes can distinguish small differences between any two different colors, so color change as an optical anti-counterfeiting element is a highly efficient anti-counterfeiting feature. An optical anti-counterfeiting element based on color and color change has been used as an important optical anti-counterfeiting feature in a number of fields such as banknote anti-counterfeiting, brand protection and so on. According to an optical principle, the color of the anti-counterfeiting element can change, that is, when the optical anti-counterfeiting element is tilted, the color in the optical anti-counterfeiting element changes along with the change of an observation angle. With the color change extremely easy to recognize, a user is not required to learn strenuously. In order to realize the color change, the principle of a 'Fabry-Perot' interferometer and a structure of an 'absorbing layer/a dielectric layer/a reflective layer' are used, so as to form an optically variable coating with a color changing along with the change of an observation angle. The coating or the optical anti-counterfeiting element changes in optical color when tilted. Accordingly, the structure and the corresponding product can also be collectively called as 'optically variable film'.

The optically variable film, of which a color changes when the film is tilted, has been used as an anti-counterfeiting mean in numerous ways, such as security threads, wide strips and anti-counterfeiting labels.

However, in a traditional optically variable film structure, due to the existence of a reflective layer, the color information can be observed only from one side of the absorbing layer, and the white color of the reflective layer can only be observed from the other side of the optically variable film, that is, one side of the reflective layer, which limits an observation mode and a color change of the optically variable film.

SUMMARY

The objective of the embodiments of the disclosure is to provide an optical anti-counterfeiting element and an optical anti-counterfeiting product, which may provide different anti-counterfeiting features when observed on two sides.

In order to achieve the above objective, an embodiment of the disclosure provides an optical anti-counterfeiting element, which includes: a substrate having a first surface and a second surface opposite each other, at least a partial region of the substrate is transparent; and a first transflective coating, a dielectric layer and a second transflective coating which are sequentially deposited on the first surface, wherein a ratio of a refractive index of the first transflective coating to an extinction coefficient of the first transflective coating is different from a ratio of a refractive index of the second transflective coating to an extinction coefficient of the second transflective coating.

Correspondingly, an embodiment of the disclosure further provides a manufacturing method of an optical anti-counterfeiting element, which includes: providing a substrate having a first surface and a second surface opposite each other, at least a partial region of the substrate is transparent; and depositing a first transflective coating, a dielectric layer and a second transflective coating on the first surface sequentially, wherein a ratio of a refractive index of the first transflective coating to an extinction coefficient of the first transflective coating is different from a ratio of a refractive index of the second transflective coating to an extinction coefficient of the second transflective coating.

The above optical anti-counterfeiting element or the optical anti-counterfeiting element manufactured through the above manufacturing method provided in the embodiments of the disclosure has the following anti-counterfeiting effects: when observed from the first surface of the above anti-counterfeiting element, the above optical anti-counterfeiting element appears a relatively bright first color; when observed from the second surface of the above anti-counterfeiting element, the above optical anti-counterfeiting element appears a relatively bright second color; when observed in perspective, the above optical anti-counterfeiting element appears a third color; when observed from the first surface and the second surface respectively, the above anti-counterfeiting element appears a color change effect, that is, an optically variable effect when the above anti-counterfeiting element is tilted.

Correspondingly, an embodiment of the disclosure further provides an optical anti-counterfeiting element, which includes: a substrate having a first surface and a second surface opposite each other, at least a partial region of the substrate is transparent; a microstructure formation layer formed on the first surface, the microstructure formation layer has at least a first region and a second region, the first region is a flat region or includes a first surface micro relief structure, the second region includes a second surface micro relief structure, and a specific volume of the first surface micro relief structure is less than a specific volume of the second surface micro relief structure; and a reflective layer, a protective layer, a first transflective coating, a dielectric layer and a second transflective coating which sequentially and homomorphically cover the first region, the first transflective coating, the dielectric layer and the second transflective coating also sequentially and homomorphically cover the second region, wherein a ratio of a refractive index the first transflective coating to an extinction coefficient of the first transflective coating is different from a ratio of a refractive index of the second transflective coating to an extinction coefficient of the second transflective coating.

Correspondingly, an embodiment of the disclosure further provides a manufacturing method of an optical anti-counterfeiting element. The manufacturing method includes: providing a substrate having a first surface and a second surface opposite each other, at least a partial region of the substrate is transparent; forming a microstructure formation layer on the first surface, the microstructure formation layer has at least a first region and a second region, the first region is a flat region or includes a first surface micro relief structure, the second region includes a second surface micro relief structure, and a specific volume of the first surface micro relief structure is less than a specific volume of the second surface micro relief structure; depositing a reflective layer on the microstructure formation layer; forming a protective layer on the reflective layer; immersing a structure formed in the above steps into a corrosion solution to corrode the reflective layer and the protective layer in the second region; taking out and cleaning a corroded structure; and depositing a first transflective coating, a dielectric layer and a second transflective coating from a side of the first surface of the corroded structure sequentially, wherein a ratio of a refractive index of the first transflective coating to an extinction coefficient of the first transflective coating is different from a ratio of a refractive index the second transflective coating to an extinction coefficient of the second transflective coating.

The above optical anti-counterfeiting element or the optical anti-counterfeiting element manufactured through the above manufacturing method provided in the embodiments of the disclosure has the following anti-counterfeiting effects: when observed from the first surface of the above anti-counterfeiting element, the first region of the above optical anti-counterfeiting element appears a first color with relatively high brightness and saturation, the second region appears a second color, and the first color and the second color both appear an effect of color change when the optical anti-counterfeiting element is tilted; when observed from the second surface of the optical anti-counterfeiting element, the first region of the above optical anti-counterfeiting element appears a third color, the second region appears a fourth color, and the fourth color appears an effect of dark color change and the third color remains unchanged when the optical anti-counterfeiting element is tilted; when the optical anti-counterfeiting element is observed in perspective, the first region is non-transparent, and the second region appears a fifth color.

Correspondingly, an embodiment of the disclosure further provides an optical anti-counterfeiting product, which includes the above optical anti-counterfeiting element and a carrier, the optical anti-counterfeiting element is attached to the carrier.

Other features and advantages of the embodiments of the disclosure will be described in detail in the specific embodiments that follows.

BRIEF DESCRIPTION OF THE DRAWINGS

The accompanying drawings, which are used for providing further understanding of the embodiments of the disclosure and constitute a part of the description, together with the following specific embodiments, serve to explain the embodiments of the disclosure instead of limiting same. In the accompanying drawings.

DETAILED DESCRIPTION OF THE EMBODIMENTS

The detailed description of the embodiment of the disclosure is described in detail below in conjunction with the accompanying drawings. It should be understood that the detailed description described herein is merely illustrative of the embodiment of the disclosure and is not intended to limit the embodiment of the disclosure.

Figure 1:
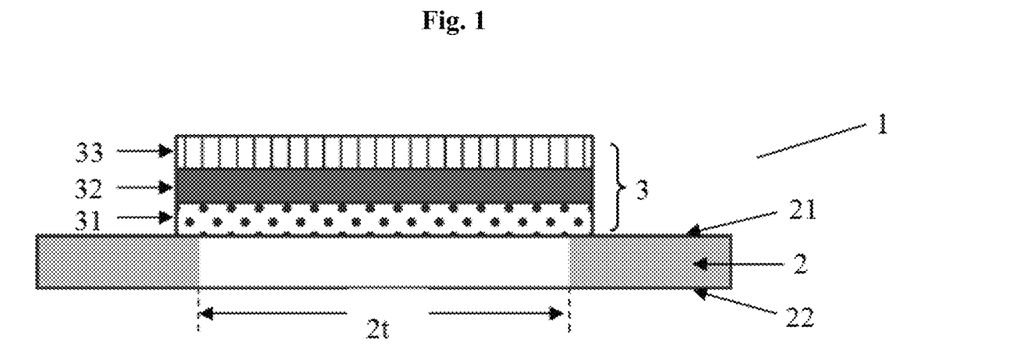
FIG. 1 shows a schematic sectional view of an optical anti-counterfeiting element according to an embodiment of the disclosure.

FIG. 1 shows a schematic sectional view of an optical anti-counterfeiting element according to an embodiment of the disclosure. As shown in FIG. 1, the embodiment of the disclosure provides an optical anti-counterfeiting element 1, which includes: a substrate 2 having a first surface 21 and a second surface 22 opposite each other, and a first transflective coating 31, a dielectric layer 32 and a second transflective coating 33 which are sequentially deposited on the first surface 21, wherein a ratio of a refractive index of the first transflective coating 31 to an extinction coefficient of the first transflective coating 31 is different from a ratio of a refractive index of the second transflective coating 33 to an extinction coefficient of the second transflective coating 33. The first transflective coating 31, the dielectric layer 32 and the second transflective coating 33 form an optically variable coating 3 having a double-sided observation effect. At least a partial region of the substrate 2 may be transparent, as shown in FIG. 1, a portion, with a length of 2t, of the substrate 2 is transparent. The substrate 2 may be formed of polyethylene terephthalate (PET), etc. The optical anti-counterfeiting element provided in the embodiment of the disclosure has the following anti-counterfeiting effects: when observed from the first surface 21 of the above anti-counterfeiting element, the above optical anti-counterfeiting element appears a relatively bright first color; when observed from the second surface 22 of the above anti-counterfeiting element, the above optical anti-counterfeiting element appears a relatively bright second color; when observed in perspective, the above optical anti-counterfeiting element 1 appears a third color; when observed from the first surface 21 and the second surface 22 respectively, the above anti-counterfeiting element 1 appears a color change effect, that is, an optically variable effect when the above anti-counterfeiting element 1 is tilted.

In a range of at least part of a visible spectrum, the ratio of the refractive index to the extinction coefficient of one of the first transflective coating 31 and the second transflective coating 33 may be less than 0.2, and the ratio of the refractive index to the extinction coefficient of the other one thereof may be greater than 0.2, better when being closer to 1, and more specifically 0.5-2. For example, a component material of the transflective coating having the ratio of the refractive index to the extinction coefficient less than 0.2 includes one or more of the following: aluminum or silver, which is not limited by the embodiment of the disclosure, and may include any material having a ratio of a refractive index to an extinction coefficient less than 0.2. A component material of the transflective coating having the ratio of the refractive index to the extinction coefficient greater than 0.2 includes one or more of the following one or more: chromium, silicon, zinc, nickel or titanium, which is not limited by the embodiment of the disclosure, and may be any material having a ratio of a refractive index to an extinction coefficient greater than 0.2.

In order to achieve a feature of two-sided observation, the first transflective coating 31 and the second transflective coating 33 have a transflective effect, that is, the reflectivity and transmissivity of the first transflective coating 31 and the second transflective coating 33 are basically the same in a range of the visible spectrum by controlling thicknesses of the first transflective coating 31 and the second transflective coating 33. Since a metal material has relatively high reflectivity, a metal layer of a transflective material is generally relatively thin and has a thickness less than 10 nm.

In an embodiment, a refractive index of the dielectric layer may be less than 1.8, for example, a component material of the dielectric layer may include silicon dioxide, magnesium fluoride, cryolite, etc. In this way, the first transflective coating 31/the dielectric layer 32/the second transflective coating 33 forms a 'Fabry-Perot' resonant cavity structure, such that a specific wavelength in visible light may be subjected to constructive interference for enhancement, and other wavelengths may be subjected to destructive interference for detraction. Therefore, when the above optical anti-counterfeiting element is observed, a specific color may be obtained; when the above optical anti-counterfeiting element is tilted, an optical path of light in a resonant cavity changes, and a feature interference wavelength changes, so that the optical anti-counterfeiting element appear another color, that is, an optically variable effect is generated. Meanwhile, since the ratio of the refractive index n of the first transflective coating 31 to the extinction coefficient k of the first transflective coating 31 is different from the ratio of the refractive index n of the second transflective coating 33 to the extinction coefficient k of the second transflective coating 33, different materials are served as a transflective coating when observed from different sides. For example, when observed from a side of the first transflective coating 31, the first transflective coating 31 is served as the transflective coating, and the second transflective coating 33 is served as the reflective layer. Otherwise, when observed from a side of the second transflective coating 33, the second transflective coating 33 is served as the transflective coating, and the first transflective coating 31 is served as the reflective layer. When light is affected by a transflective metal film, there is a certain phase difference between reflection light and transmission light, and the phase difference is determined by the refractive index n and the extinction coefficient k. Therefore, when different materials are served as the transflective coating of the 'Fabry-Perot' resonant cavity structure, phase differences are also different, such that colors are different when the anti-counterfeiting element is observed from different surfaces.

Figure 2:
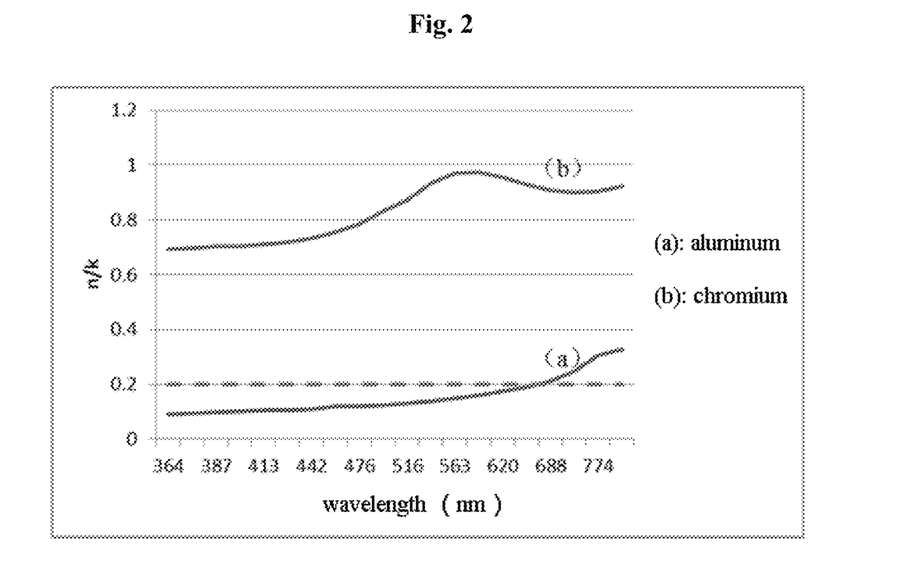
FIG. 2 shows a schematic diagram of a curve of a ratio of a refractive index n of aluminum to an extinction coefficient k of aluminum and a curve of a ratio of a refractive index n of chromium to an extinction coefficient k of chromium.

In an embodiment of the disclosure, a component material of the first transflective coating 31 may include aluminum, and a component material of the second transflective coating 33 may include chromium. In FIG. 2, curve (a) represents in a ratio of a refractive index n of aluminum to an extinction coefficient k of aluminum, and curve (b) represents in a ratio of a refractive index n of chromium to an extinction coefficient k of chromium. As shown in FIG. 2, the ratio of the refractive index n of the aluminum to the extinction coefficient k of the aluminum is less than 0.2 in a range of part of a visible spectrum (380 nm-680 nm), and the ratio of the refractive index n of the chromium to the extinction coefficient k of the chromium is greater than 0.2 in the range of part of the visible spectrum (380 nm-680 nm).

For example, the component material of the dielectric layer may include silicon dioxide. More specifically the aluminum of the first transflective coating 31 may have a thickness of 9 nm, the silicon dioxide of the dielectric layer may have a thickness of 420 nm, and the chromium of the second transflective coating 33 may have a thickness of 7 nm.

Figure 3:
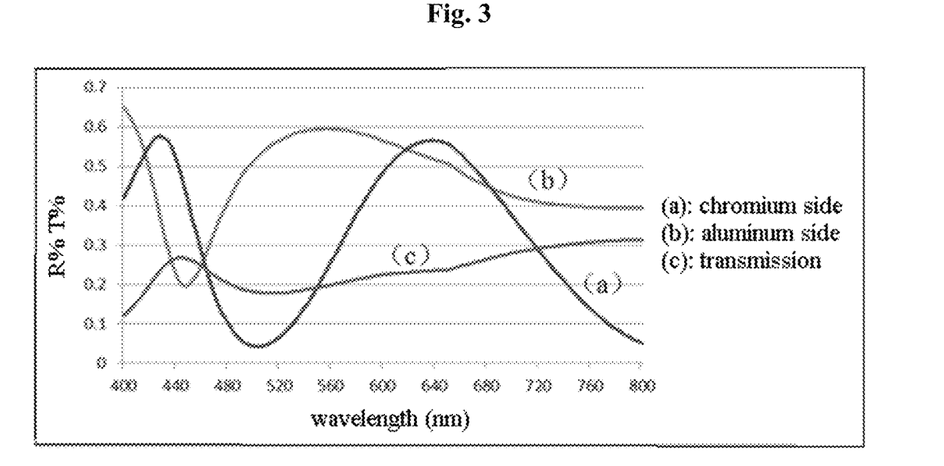
FIG. 3 shows reflection spectra when an optical anti-counterfeiting element according to an embodiment of the disclosure is observed from different directions.

FIG. 3 shows reflection spectra when the above optical anti-counterfeiting element is observed from different directions. When observed from a side of the first surface 21 of the optical anti-counterfeiting element 1, the metal chromium of the second transflective coating 33 is served as an absorbing layer of the optically variable coating 3, the metal aluminum of the first transflective coating 31 is served as a reflective layer of the optically variable coating 3, and when the silicon dioxide of the dielectric layer has a thickness of 420 nm, a reflection spectrum is as shown in curve (a) in FIG. 3, and the optical anti-counterfeiting element appears magenta. When observed through the substrate 2 from a side of the second surface 22 of the optical anti-counterfeiting element 1, the metal aluminum of the first transflective coating 31 is served as the absorbing layer of the optically variable coating 3, the metal chromium of the second transflective coating 33 is served as the reflective layer of the optically variable coating 3, and when the silicon dioxide of the dielectric layer has a thickness of 420 nm, the reflection spectrum is as shown in curve (b) in FIG. 3, and the optical anti-counterfeiting element appears green. Therefore, when observed on two sides, the optical anti-counterfeiting element 1 appears different colors, and when the optical anti-counterfeiting element 1 is tilted, both of the two colors change, showing an optically variable effect. Since metal layers on two sides of the optically variable coating 3 are both the transflective coating, on the basis that the two sides have colors, the optical anti-counterfeiting element has a certain color when observed in transmitted light, and as shown in FIG. 3, curve (c) is a transmission spectrum of the optical anti-counterfeiting element 1, and the optical anti-counterfeiting element appears blue.

Correspondingly, an embodiment of the disclosure further provides a manufacturing method of an optical anti-counterfeiting element, which includes: providing a substrate having a first surface and a second surface opposite each other, at least a partial region of the substrate is transparent; and depositing a first transflective coating, a dielectric layer and a second transflective coating on the first surface sequentially, wherein a ratio of a refractive index of the first transflective coating to an extinction coefficient of the first transflective coating is different from a ratio of a refractive index of the second transflective coating to an extinction coefficient of the second transflective coating.

In an embodiment, the first transflective coating may be obtained on the first surface of the substrate by physical vapor deposition, the dielectric layer may be obtained on the first transflective coating by physical vapor deposition or printing/coating, and the second transflective coating may be obtained on the dielectric layer by physical vapor deposition.

The selection principle of component materials and thicknesses of the substrate, the first transflective coating, the dielectric layer and the second transflective coating in the manufacturing method of an optical anti-counterfeiting element provided in the embodiment of the disclosure is the same as that of the optical anti-counterfeiting element provided in the above embodiment of the disclosure, which will not be repeated herein.

Figure 4:
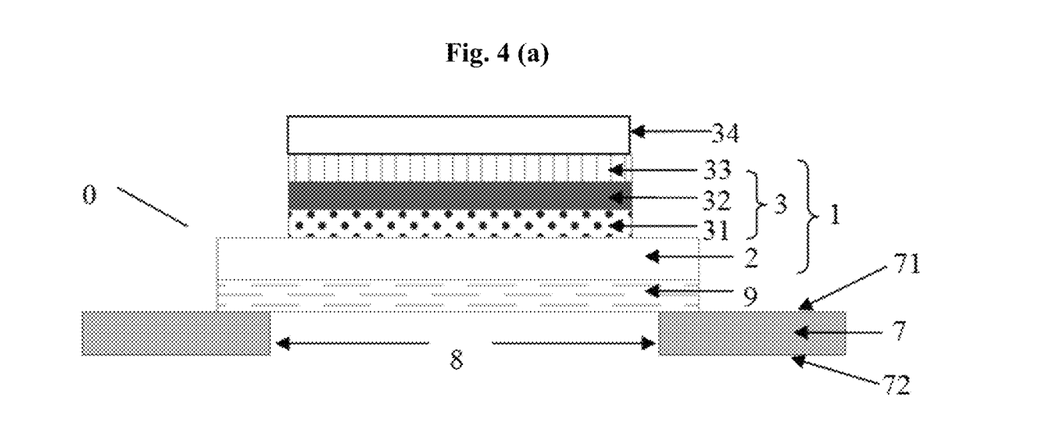
FIG. 4(a) shows a schematic sectional view of an optical anti-counterfeiting product according to an embodiment of the disclosure.
FIG. 4(b) shows a schematic diagram of an effect of observing the optical anti-counterfeiting product shown in FIG. 4(a) from a first surface.
FIG. 4(c) shows a schematic diagram of an effect of observing the optical anti-counterfeiting product shown in FIG. 4(a) from a second surface.
Figure 5:
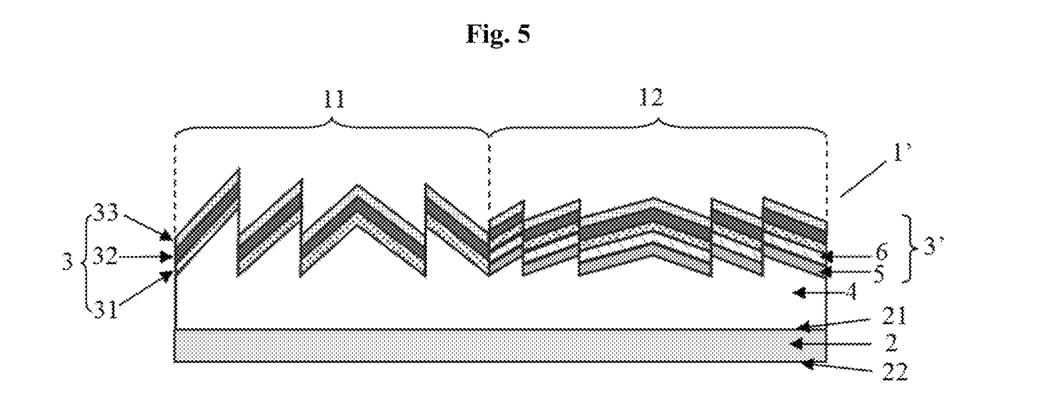
FIG. 5 shows a schematic sectional view of an optical anti-counterfeiting element according to another embodiment of the disclosure.

FIG. 4(a) shows a schematic sectional view of an optical anti-counterfeiting product according to an embodiment of the disclosure. FIG. 4(b) shows a schematic diagram of an effect of observing the optical anti-counterfeiting product shown in FIG. 4(a) from a first surface. FIG. 4(c) shows a schematic diagram of an effect of observing the optical anti-counterfeiting product shown in FIG. 4(a) from the second surface. As shown in FIG. 4(a), an optical anti-counterfeiting product 0 provided in the embodiment of the disclosure may include an optical anti-counterfeiting element 1 and a carrier 7, the carrier 7 has a first surface 71 and a second surface 72, and the optical anti-counterfeiting element 1 covers on the first surface 71 of the carrier. The carrier 7 may be, for example, a paper-based carrier. There is an opening 8 in a specific shape in a specific position of the carrier 7, such that the first surface and the second surface of the optical anti-counterfeiting element may be observed by means of the opening 8. The carrier 7 is not limited thereto and may be transparent, or semi-transparent or at least partially transparent. The optical anti-counterfeiting element 1 and the carrier 7 may be bonded together by means of an adhesive 9, which may be transparent, or semi-transparent or at least partially transparent. FIG. 4(a) is a schematic sectional view of FIG. 4(b) along a dashed line.

formed on the first surface 21, the microstructure formation layer 4 has at least a second region 11 and a first region 12, the first region 12 is a flat region or includes a first surface micro relief structure, the second region 11 includes a second surface micro relief structure, and a specific volume of the first surface micro relief structure is less than a specific volume of the second surface micro relief structure, wherein 'specific volume' is a ratio of a volume occupied by the micro relief structure to a projection of the micro relief structure on a plane of the substrate, which may be approximately regarded as a feature height of the micro relief structure; a reflective layer 5, a protective layer 6, a first transflective coating 31, a dielectric layer 32 and a second transflective coating 33 sequentially and homomorphically cover on the first surface micro relief structure of the first region 12, the first transflective coating 31, the dielectric layer 32 and the second transflective coating 33 also sequentially and homomorphically cover on the second surface micro relief structure of the second region 11, wherein a ratio of a refractive index of the first transflective coating 31 to an extinction coefficient of the first transflective coating 31 is different from a ratio of a refractive index of the second transflective coating 33 to an extinction coefficient of the second transflective coating 33. The first transflective coating 31, the dielectric layer 32 and the second transflective coating 33 covering on the second region 11 form a multi-layer optically variable coating 3, the reflective layer 5, the protective layer 6, the first transflective coating 31, the dielectric layer 32 and the second transflective coating 33 covering on the first region 12 form a multi-layer optically variable coating 3', and the component material of the substrate 2 may include polyethylene terephthalate (PET), etc. The optical anti-counterfeiting element provided in the embodiment of the disclosure has the following anti-counterfeiting effects: when observed from the first surface 21 of the above anti-counterfeiting element, the first region 12 of the optical anti-counterfeiting element appears a first color with relatively high brightness and saturation, the second region 11 appears a second color, and when the optical anti-counterfeiting element is tilted, the first color and the second color both appear a color change effect; when observed from the second surface 22 of the optical anti-counterfeiting element, the first region 12 of the optical anti-counterfeiting element appears a third color, the second region 11 appears a fourth color, and when the optical anti-counterfeiting element is tilted, the fourth color appears a dark color change effect, and the third color remains unchanged; when the optical anti-counterfeiting element is observed in perspective, the first region 12 is non-transparent, and the second region 11 appears a fifth color.

Correspondingly, an embodiment of the disclosure further provides a manufacturing method of an optical anti-counterfeiting element shown in FIG. 5, which includes: providing a substrate 2 having a first surface 21 and a second surface 22 opposite each other, at least a partial region of the substrate 2 is transparent; forming a microstructure formation layer on the first surface 21, the microstructure formation layer 4 has at least a second region 11 and a first region 12, the first region 12 is a flat region or includes a first surface micro relief structure, the second region 11 includes a second surface micro relief structure, and a specific volume of the first surface micro relief structure being less than a specific volume of the second surface micro relief structure; depositing a reflective layer 5 on the microstructure formation layer 4; forming a protective layer 6 on the reflective layer 5; immersing a structure formed in the above steps into a corrosion solution to corrode the reflective layer and the protective layer in the second region; taking out and cleaning a corroded structure; and depositing a first transflective coating 31, a dielectric layer 32 and a second transflective coating 33 from a side of the first surface of the corroded structure sequentially, wherein a ratio of a refractive index of the first transflective coating 31 to an extinction coefficient of the first transflective coating 31 is different from a ratio of a refractive index of the second transflective coating 33 to an extinction coefficient of the second transflective coating 33.

In an embodiment, the first transflective coating 31 may be obtained by physical vapor deposition, the dielectric layer 32 may be obtained on the first transflective coating 31 by physical vapor deposition or printing/coating, and the second transflective coating 33 may be obtained on the dielectric layer 32 by physical vapor deposition.

In a range of at least part of a visible spectrum, the ratio of the refractive index to the extinction coefficient of one of the first transflective coating 31 and the second transflective coating 33 may be less than 0.2, and the ratio of the refractive index to the extinction coefficient of the other one thereof may be greater than 0.2, better when being closer to 1, and more specifically 0.5-2. For example, a component material of the transflective coating having the ratio of the refractive index to the extinction coefficient less than 0.2 includes one or more the following: aluminum or silver, which is not limited by the embodiment of the disclosure, and may include any material having a ratio of a refractive index to an extinction coefficient less than 0.2. A component material of the transflective coating having the ratio of the refractive index to the extinction coefficient greater than 0.2 includes one or more the following: chromium, silicon, zinc, nickel or titanium, which is not limited by the embodiment of the disclosure, and may include any material having a ratio of a refractive index to an extinction coefficient greater than 0.2.

In order to achieve a feature of two-sided observation, the first transflective coating 31 and the second transflective coating 33 have transflective effects, that is, the reflectivity and transmissivity of the first transflective coating 31 and the second transflective coating 33 are basically the same in a range of the visible spectrum by controlling thicknesses of the first transflective coating 31 and the second transflective coating 33. Since a metal material has relatively high reflectivity, a metal layer of a transflective material is generally relatively thin and has a thickness less than 10 nm.

In an embodiment, a refractive index of the dielectric layer may be less than 1.8, for example, a component material of the dielectric layer may include silicon dioxide, magnesium fluoride, cryolite, etc. In this way, the first transflective coating 31/the dielectric layer 32/the second transflective coating 33 form a 'Fabry-Perot' resonant cavity structure, such that a specific wavelength in visible light may be subjected to constructive interference for enhancement, and other wavelengths may be subjected to destructive interference for detraction.

When the optical anti-counterfeiting element is manufactured, the reflective layer 5 is deposited on the second region 11 and the first region 12 at the same time. For example, the component material of the reflective layer 5 may include metal aluminum and may have a thickness of 30 nm. The protective layer 6 covers on the reflective layer 5 by coating or printing. For example, the component material of the protective layer 6 may include acrylic resin and may have a thickness of about 150 nm. In the embodiment of the disclosure, the reflective layer 5 and the protective layer 6 both cover on the microstructure formation layer homomorphically. Since a specific volume (equivalent to a depth) of the surface micro relief structure in the second region 11 is greatly different from a specific volume of the surface micro relief structure in the first region 12, the protective layer 6 (such as, acrylic resin) has a certain fluidity during coating or printing, such that the protective layer 6 may completely cover on the reflective layer 5 in the first region 12 with a smaller specific volume; the specific volume of the surface micro relief structure in the second region 11 is larger, such that the protective layer 6 is deposited at a bottom end of the surface micro relief structure by leveling, and a part of the reflective layer 6 is exposed outside. When the above structure passes through a corrosion solution, such as thermokalite, the reflective layer of the second region 11 is corroded, while the reflective layer of the first region 12 is protected and remained. Thus, a structure without reflective layer and protective layer in the second region 11 and with a reflective layer and a protective layer in the first region 12 may be formed.

In an embodiment of the disclosure, the first transflective coating 31 may have a thickness of 7 nm and the component material of the first transflective coating 31 may include aluminum, the dielectric layer 32 may have a thickness of 400 nm and the component material of the dielectric layer 32 may include magnesium fluoride, and the second transflective coating 33 may have a thickness of 7 nm and the component material of the second transflective coating 33 may include zinc. The surface micro relief structure in the second region 11 may have a feature width (a width of a projection of a cell of the micro relief structure in a horizontal plane) of 15 μm, and a feature height (a height of the cell of the micro relief structure) of 3 μm. The surface micro relief structure in the first region 12 may have a feature width of 7 μm and a feature height of 0.7 μm. The reflective layer 5 may have a thickness of 30 nm and the component material of the reflective layer 5 may include metal aluminum. The protective layer 6 may have a thickness of 150 nm and the component material of the protective layer 6 may include acrylic resin.

When observed from a side of the second surface 22 of the substrate, the optically variable coating 3 by microstructure modulation of the second region 11 of the optical anti-counterfeiting element 1' is observed and appears blue, the first region 12 appears a color of metal aluminum due to deposition of the reflective layer of aluminum on the surface micro relief structure; when observed from the first surface 21 of the substrate, the second region 11 appears golden different from a color when observed from the other side, and the first region 12 appears yellow green since the multi-layer optically variable coating 3' has the reflective layer 5 (made of aluminum and having a thickness of 30 nm)/the protective layer 6 (made of acrylate and having a thickness of 150 nm)/the first transflective coating 31 (made of aluminum and having a thickness of 7 nm)/the dielectric layer 32 (made of magnesium fluoride and having a thickness of 400 nm)/the second transflective coating 33 (made of zinc and having a thickness of 7 nm). Therefore, four colors may match in different observation directions and different positions.

In the above optical anti-counterfeiting element, the thickness of the protective layer 6 may change. The protective layer is used for distinguishing a protection speed of the optically variable coating 3 on a microstructure of the second region 11 and the optically variable coating 3' on a microstructure of the second region 12 to a corrosion solution, such that one side is corroded and the other side is protected. Meanwhile, since the thickness of the protective layer 6 may influence a color the optically variable coating 3' appears, the thickness of the protective layer 6 needs to be protected, and protection performance and a desired color are achieved.

Figure 6:
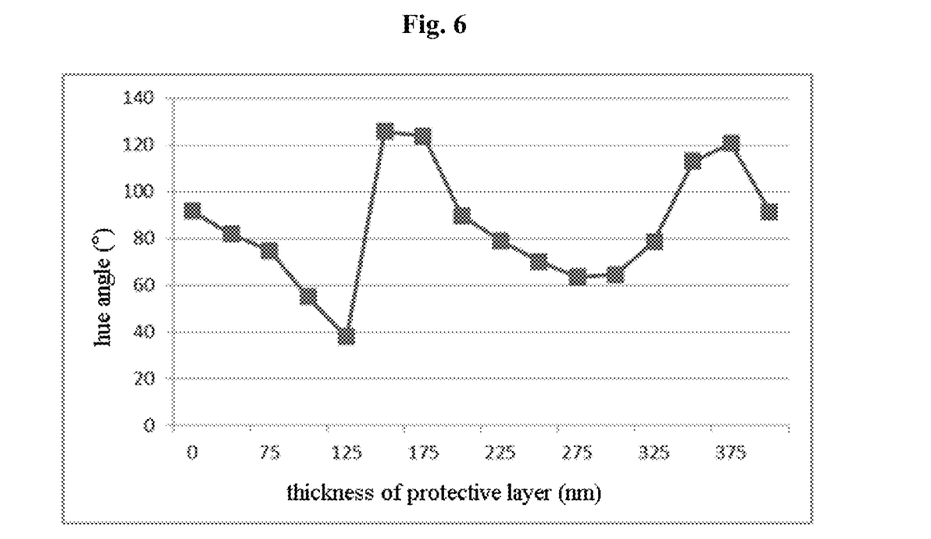
FIG. 6 shows a schematic diagram of a color of an optically variable coating variation with a thickness of a protective layer in the optical anti-counterfeiting element shown in FIG. 5.

FIG. 6 shows an influence of the thickness of the protective layer 6 on an appearance color of the multi-layer optically variable coating 3'. It can be seen from the figure that the color of the multi-layer optically variable coating 3' changes obviously with an increase of the thickness of the protective layer 6, and the color may change in orange red, golden, yellow and yellow green in a change range of 50 nm-400 nm. Therefore, on the premise that the thicknesses of the reflective layer, the transflective coating and the dielectric layer are determined, and the premise that a good hollow effect may be achieved, the color of the multi-layer optically variable coating 3' may be modulated by adjusting the thickness of the protective layer 6.

By appropriately arranging microstructures in the microstructure formation layer 4, a dynamic effect, a stereoscopic embossment, image conversion, etc. may be achieved. Meanwhile, since the second region 11 and the first region 12 are obtained due to the fact that a difference between microstructures on the two regions leads to different corrosion speeds of the corrosion solution, the coatings on the regions 11 and 12 may be strictly positioned on the two regions, that is, the second region 11 having a microstructure with a large specific volume has only the double-sided observation optically variable coating 3 (the first transflective coating 31/the dielectric layer 32/the second transflective coating 33), and no other coatings; the first region 12 having a microstructure with a small specific volume has only the multi-layer optically variable coating 3' (the reflective layer 5/the protective layer 6/the first transflective coating 31/the dielectric layer 32/the second transflective coating 33), and no other coatings. In this way, different dynamic and stereoscopic features and different color features are defined in different regions, and the above various optical features do not interfere with each other and are strictly defined in the respective regions.

Figure 7:
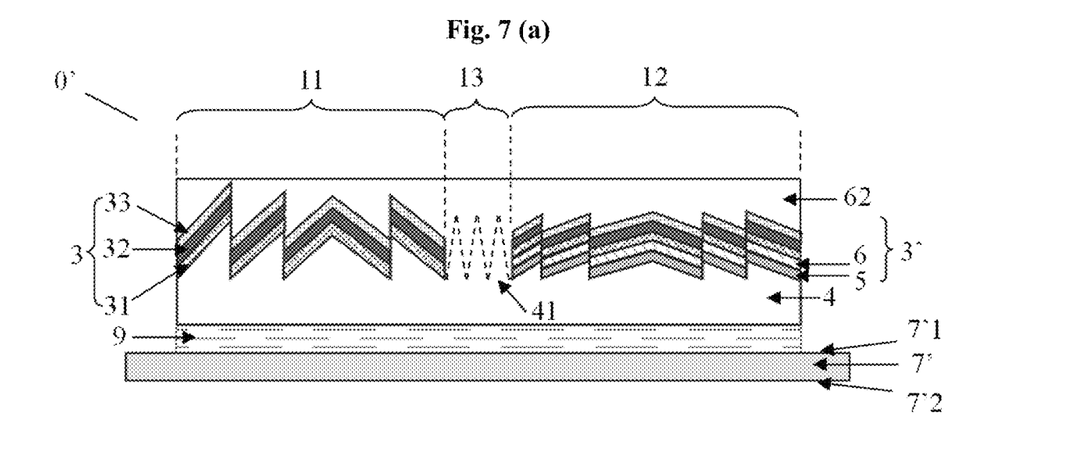
FIG. 7(a) shows a schematic sectional view of an optical anti-counterfeiting product according to another embodiment of the disclosure.
FIG. 7(b) shows a schematic diagram of an effect of observing the optical anti-counterfeiting product shown in FIG. 7(a) from the first surface.
FIG. 7(c) shows a schematic diagram of an effect of observing the optical anti-counterfeiting product shown in FIG. 7(a) from the second surface.

FIG. 7(a) shows a schematic sectional view of an optical anti-counterfeiting product according to another embodiment of the disclosure. As shown in FIG. 7(a), the optical anti-counterfeiting product 0' provided in the embodiment of the disclosure may include the optical anti-counterfeiting element shown in FIG. 5 and a carrier 7', the carrier 7' has a first surface 7'1 and a second surface 7'2, and the optical anti-counterfeiting element covers on the first surface 7'1 of the carrier. The carrier 7' may be transparent, for example, the carrier may be a transparent plastic carrier. In the optical anti-counterfeiting element, the second region 11 has a microstructure with a relatively large 'specific volume', a first transflective coating 31, a dielectric layer 32 and a second transflective coating 33 are sequentially formed on the microstructure; the first region 12 has a microstructure with a relatively small 'specific volume', a reflective layer 5, a protective layer 6, a first transflective coating 31, a dielectric layer 32 and a second transflective coating 33 are sequentially formed on the microstructure. The optical anti-counterfeiting element and the carrier 7' may be bonded together by means of an adhesive 9, which may be transparent, or semi-transparent or at least partially transparent.

In an embodiment of the disclosure, the first transflective coating 31 may have a thickness of 6 nm and the component material of the first transflective coating 31 may include aluminum, the dielectric layer 32 may have a thickness of 402 nm and the component material of the dielectric layer 32 may include magnesium fluoride, and the second transflective coating 33 may have a thickness of 7 nm and the component material of the second transflective coating 33 may include chromium. The reflective layer 5 may have a thickness of 30 nm and the component material of the reflective layer 5 may include metal aluminum. The protective layer 6 may have a thickness of 150 nm and the component material of the protective layer 6 may include acrylic resin.

Further referring to FIG. 7(a), the optical anti-counterfeiting element may further include a hollow region 13, and ranges of the second region 11 and the first region 12 are defined by the hollow region 13. The hollow region 13 includes a hollow microstructure 41, and the hollow microstructure 41 has a greater depth-to-width ratio or a greater specific volume than that of the microstructure of the second region 11 and the microstructure of the first region 12, such that when a protective layer is formed on the second transflective coating 33 and the multi-layer optically variable coating or the reflective layer is hollowed out, the region 13 may be accurately hollowed out, and the multi-layer optically variable coating of the second region 11 and the multi-layer optically variable coating and the reflective layer of the first region 12 may be accurately retained.

In an embodiment, a surface of the optical anti-counterfeiting element may be covered with a product protective layer 62, so as to prevent the product from being polluted and damaged by an external pollutant, and a refractive index of the product protective layer 62 may be the same as or close to that of the microstructure formation layer 4. When the product protective layer 62 covers on the hollow microstructure 41 of the hollow region 13, since the refractive index of the product protective layer is the same as or close to that of the hollow microstructure 41, an interface between same does not exist, and the hollow region 13 appears a completely transparent effect when observed from a side of the protective layer 62.

FIG. 7(b) shows a situation when observed from a side of the first surface 7'1 of the carrier 7', and FIG. 7(c) shows a situation when observed from a side of the second surface 7'2 of the carrier 7'. FIG. 7(a) is a sectional situation at the dashed line of FIG. 7(b). When observed from a side of the second surface 7'2 of the carrier 7', a blue number '10' appears in the second region 11, and when the carrier is tilted forwards and backwards, a light spot appears a dynamic feature from top to bottom and the color changes. A 'flower' pattern in the first region 12 appears an embossed effect in a color of metal aluminum, and the color does not change when the carrier is tilted. When observed from a side of the first surface 7'1 of the carrier 7' which is plastic, a golden number '10' appears in the second region 11, and when the carrier is tilted forwards and backwards, a light spot appears a dynamic feature from bottom to top and the color becomes green. A 'flower' pattern in the first region 12 appears an embossed effect in yellow green, and the color changes when the carrier is tilted.

The optical anti-counterfeiting element provided in the embodiment of the disclosure widens an observation mode due to the feature of being in different colors when observed on two sides, so as to be capable of being applied to scenes which may be observed on two sides. When traditional security threads, wide strips and other products are applied to banknotes, only one side may be observed, and the other side is blocked by a carrier (such as paper). Since a color of the other side is the same as a color of the observed side (in a holographic situation) or there is only a color of a reflective layer (such as aluminum) (in the case of an optically variable film), an observer may not be attracted or shocked more. However, by using the optical anti-counterfeiting element with different colors on two sides and changing in color in the case of being tilted, two-sided observation may be achieved, and the optical anti-counterfeiting element may be applied to various scenes, such as banknotes, negotiable securities, etc. for paper-based and plastic-based carriers.

Some specific implementations of the embodiment of the disclosure are described in detail above with reference to the accompanying drawings. However, the embodiments of the disclosure are not limited to specific details of the implementation described above. Within the scope of the technical concept of the embodiments of the disclosure, various simple modifications can be made to the technical solutions of the embodiments of the disclosure, and these simple modifications all fall within the scope of protection of the embodiments of the disclosure.

It should also be noted that various specific technical features described in the specific implementations described above may be combined in any suitable manner, without contradiction. In order to avoid unnecessary repetition, the embodiments of the disclosure will not describe various possible combinations respectively.

Those skilled in the art can understand that all or part of the steps of the methods in the above embodiments may be implemented by instructing associated hardware by means of a program, the program is stored in a storage medium and includes several instructions for enabling a single chip microcomputer, a chip or a processor to implement all or part of the steps of the methods described in the various embodiments of the disclosure. The foregoing storage medium includes media such as a USB flash disk, a mobile hard disk, a read-only memory (ROM), a random access memory (RAM), a diskette or an optical disk, etc., which may store program codes.

In addition, various different implementations of the embodiments of the disclosure may also be combined randomly, so long as they do not deviate from the idea of the embodiments of the disclosure, and they should also be regarded as disclosed in the embodiments of the disclosure.

What is claimed is:

1. An optical anti-counterfeiting element, comprising:
a substrate having a first surface and a second surface opposite each other, at least a partial region of the substrate is transparent;
a microstructure formation layer formed on the first surface, the microstructure formation layer has at least a first region and a second region, the first region comprises a first surface micro relief structure, the second region comprises a second surface micro relief structure, and a specific volume of the first surface micro relief structure is less than a specific volume of the second surface micro relief structure; and
a reflective layer, a protective layer, a first transflective coating, a dielectric layer and a second transflective coating which sequentially and homomorphically cover on the first region, the first transflective coating, the dielectric layer and the second transflective coating also sequentially and homomorphically cover on the second region, wherein a ratio of a refractive index of the first transflective coating to an extinction coefficient of the first transflective coating is different from a ratio of a refractive index of the second transflective coating to an extinction coefficient of the second transflective coating;
the first transflective coating, the dielectric layer and the second transflective coating covering on the second region from a first multi-layer optically variable coating, and the reflective layer, the protective layer, the first transflective coating, the dielectric layer and the second transflective coating, covering on the first region form a second multi-layer optically variable coating, and the first multi-layer optically variable coating on the second region and the second multi-layer optically variable coating on the first region are strictly positioned on the two regions respectively.

2. The optical anti-counterfeiting element according to claim 1, wherein a thickness of the protective layer is adjusted based on different thicknesses in the case of determined thicknesses of the reflective layer, the first transflective coating, the dielectric layer and the second transflective coating to obtain a desired appearance color of a multilayer optically viable coating formed by the reflective layer, the protective layer, the first transflective coating, the dielectric layer and the second transflective coating.

3. A manufacturing method of an optical anti-counterfeiting element according to claim 1, comprising:
providing a substrate, the substrate has a first surface and a second surface opposite each other, and at least a partial region of the substrate is transparent;
forming a microstructure formation layer on the first surface, the microstructure formation layer has at least a first region and a second region, the first region is a flat region or comprises a first surface micro relief structure, the second region comprises a second surface micro relief structure, and a specific volume of the first surface micro relief structure is less than a specific volume of the second surface micro relief structure;
depositing a reflective layer on the microstructure formation layer;
forming a protective layer on the reflective layer;
immersing a structure formed in the above steps into a corrosion solution to corrode the reflective layer and the protective layer in the second region;
taking out and cleaning a corroded structure; and
depositing a first transflective coating, a dielectric layer and a second transflective coating from a side of the first surface of the corroded structure sequentially, wherein a ratio of a refractive index of the first transflective coating to an extinction coefficient of the first transflective coating is different from a ratio of a refractive index of the second transflective coating to an extinction coefficient of the second transflective coating.

4. The manufacturing method according to claim 3, wherein in a range of at least part of a visible spectrum, the ratio of the refractive index to the extinction coefficient of one of the first transflective coating and the second transflective coating is less than 0.2, and the ratio of the refractive index to the extinction coefficient of the other one thereof is greater than 0.2, preferably 0.5-2.

5. The manufacturing method according to claim 4, wherein
a component material of the transflective coating having the ratio of the refractive index to the extinction coefficient less than 0.2 comprises one or more of the following: aluminum or silver; and/or
a component material of the transflective coating having the ratio of the refractive index to the extinction coefficient greater than 0.2 comprises one or more of the following: chromium, silicon, zinc, nickel or titanium.

6. The manufacturing method according to claim 3, wherein a refractive index of the dielectric layer is less than 1.8.

7. The manufacturing method according to claim 3, wherein the protective layer may have different thicknesses in the case of determined thicknesses of the reflective layer, the first transflective coating, the dielectric layer and the second transflective coating.

8. The optical anti-counterfeiting element according to claim 1, wherein in a range of at least part of a visible spectrum, the ratio of the refractive index to the extinction coefficient of one of the first transflective coating and the second transflective coating is less than 0.2, and the ratio of the refractive index to the extinction coefficient of the other one thereof is greater than 0.2, preferably 0.5-2.

9. The optical anti-counterfeiting element according to claim 8, wherein
a component material of the transflective coating having the ratio of the refractive index to the extinction coefficient less than 0.2 comprises one or more of the following: aluminum or silver, and/or
a component material of the transflective coating having the ratio of the refractive index to the extinction coefficient greater than 0.2 comprises one or more of the following: chromium, silicon, zinc, nickel or titanium.

10. The optical anti-counterfeiting element according to claim 1, wherein a refractive index of the dielectric layer is less than 1.8.

11. The optical anti-counterfeiting element according to claim 1, wherein the optical anti-counterfeiting element further comprises a hollow region.

* * * * *